Figure 1:
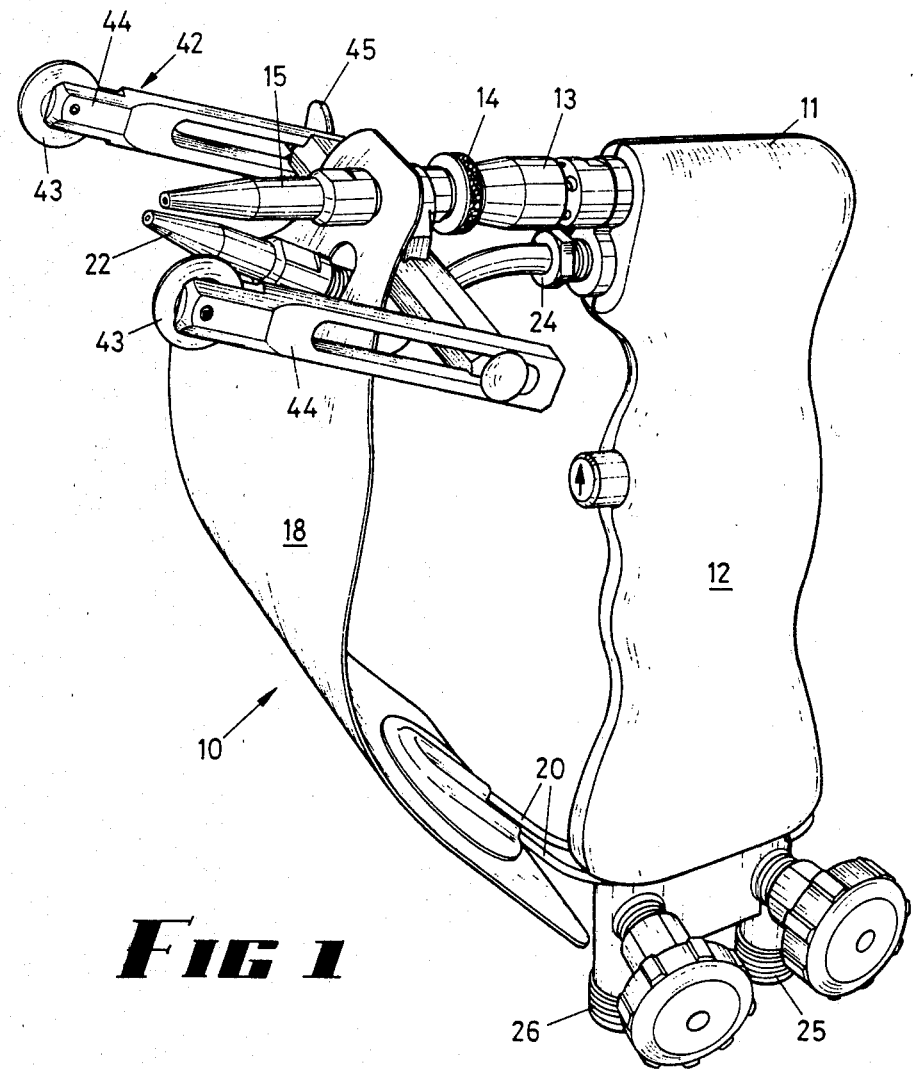

United States Patent [19]

Dillon

[11] 4,344,606
[45] Aug. 17, 1982

[54] WELDING AND CUTTING HANDPIECE

[76] Inventor: Nicholas T. E. Dillon, 10 East St., Magill, South Australia, Australia

[21] Appl. No.: 220,263

[22] Filed: Dec. 29, 1980

[30] Foreign Application Priority Data

Aug. 29, 1980 [AU] Australia .............................. 61908/80

[51] Int. Cl.³ .............................................. B23K 7/10
[52] U.S. Cl. ....................................... 266/66; 266/67; 266/68; 266/76
[58] Field of Search ...................... 266/66, 67, 68, 76, 266/48

[56] References Cited

U.S. PATENT DOCUMENTS

| 1,302,438 | 4/1919 | Rudkin | 266/66 |
| 2,036,733 | 4/1936 | Kehl | 266/66 |
| 2,095,789 | 10/1937 | Bucknam | 266/48 |
| 3,642,266 | 2/1972 | Diehl et al. | 266/48 |

Primary Examiner—W. Stallard
Attorney, Agent, or Firm—Brown & Martin

[57] ABSTRACT

An oxy-acetylene torch, having a welding and cutting handpiece wherein a flame nozzle is in communication with a gas mixing chamber and a cutting nozzle is in communication with an oxygen conduit, the cutting nozzle being supported from and displaced from the flame nozzle and so inclined to the central axis of the flame nozzle as to direct the oxygen stream into a flame when issuing from the flame nozzle.

9 Claims, 5 Drawing Figures

WELDING AND CUTTING HANDPIECE

This invention relates to a gas welding torch and cutting handpiece combination, which can be used either for welding or for cutting.

In my U.S. patent application Ser. No. 859,589 filed Dec. 12, 1977, now abandoned, which is incorporated herein, there was described and claimed a gas welding torch wherein there was an oxygen conduit in the handpiece having connection means at its upstream end for connecting to an oxygen supply hose, and a tubular oxygen director at its downstream end, the oxygen director being in gas flow communication with the conduit, a gas mixing structure comprising at least one mixing chamber defining with the oxygen director a primary mixing chamber, a combustible gas conduit in the handpiece having connection means at its upstream end connecting it to a combustible gas supply hose, and walls in the handpiece placing the downstream end of the gas conduit into gas flow communication with the primary mixing chamber, the gas mixing structure comprising a gas mixture directing aperture having length exceeding its diameter, and walls defining a secondary mixing chamber of greater volume than the primary mixing chamber, a length exceeding its diameter, a diameter exceeding that of the gas mixture directing aperture, and a discharge nozzle at the downstream end of the secondary mixing chamber. The oxygen director, primary mixing chamber, gas mixture directing aperture and secondary mixing chamber and nozzle all have a common polar axis.

This invention relates to extensions to the above invention, and has as one of its objects the provision of gas cutting means which will not use excessive quantities of gas.

Many metals, but usually mild steel, are cut by means of oxy-acetylene cutting equipment, conventional units using about 12 cubic feet per hour of acetylene and 78 cubic feet per hour of oxygen to cut half inch plate. The cost of gas is high, and one object of this invention is to provide means whereby cutting can be effected at lower cost, and at least at the same speed as heretofore.

In this invention there is provided a welding and cutting handpiece which is useful as an oxy-acetylene torch, having a flame nozzle which is in gas flow communication with a gas mixing chamber, a cutting nozzle having an oxygen directing aperture extending therethrough and being in gas flow communication with an oxygen conduit in the handpiece, and means securing the cutting nozzle to be so inclined to the flame nozzle as to direct an oxygen stream into a flame of combustible gas when issuing from the flame nozzle.

Surprisingly it has been found that the amount of oxygen required is very much less than with conventional equipment, the oxygen issuing from the cutting nozzle being effective in cutting a very thin slot through a workpiece with very little oxidation of the metal. The required pressure can be much less (20 psi compared with 35 psi), and a wide range of thicknesses can be cut with a single cutting nozzle and flame nozzle arrangement.

Heretofore the handpiece required for welding and the handpiece required for cutting were different handpieces, and it will be appreciated by those in the art that there is usually much less cutting than welding, but in an embodiment of this invention another object is to provide means whereby a single handpiece may be utilised, and whereby the handpiece may be converted from a welding handpiece to a cutting handpiece by a simple conversion, and in that embodiment there is provided a threaded recess in a torch body which is in communication with a conduit itself communicating with an oxygen supply source, and a cutting nozzle having a stem arranged to be sealably engaged in the recess. When the cutting function is not required, the stem is simply released from the recess and the recess closed with a closure plug.

Quite often it is desirable to be able to cut both in a forward and backward direction, but it is also desirable that the hand should not be subject to the heat radiated from the workpiece immediately after cutting, and in a further embodiment of this invention there is provided a hand guard, and means on the hand guard to enable the hand guard to be quickly and easily attached to or removed from the handpiece. This combined with the relatively small consumption of gases and therefore the relatively small amount of heat imparted to the workpiece, makes it possible for an operator to work in any direction without endangering his person to burns due to radiated heat.

Figure 2:
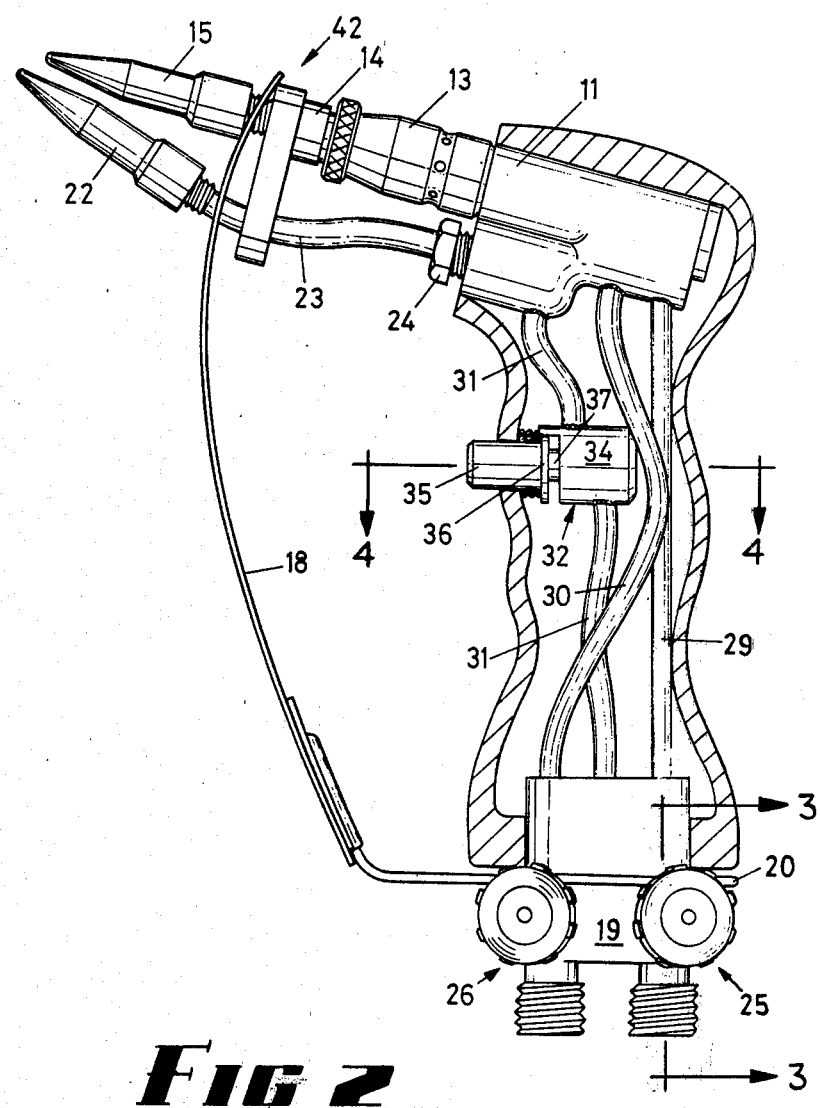
Figure 3:
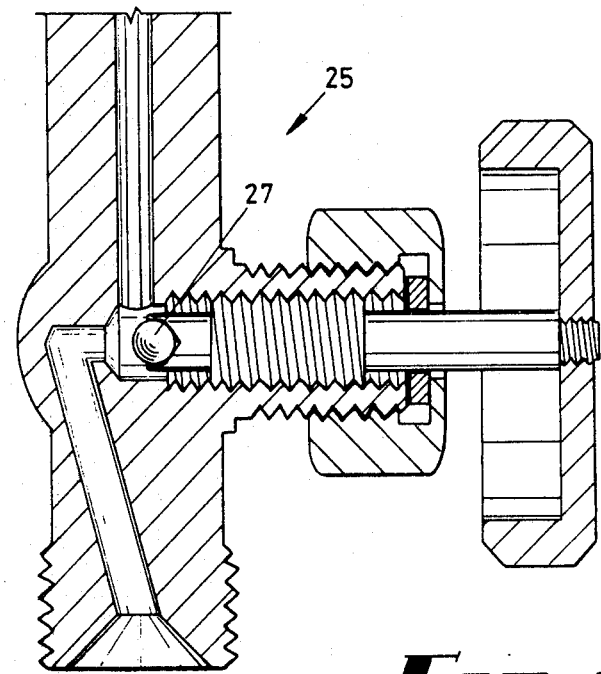
Figure 4:
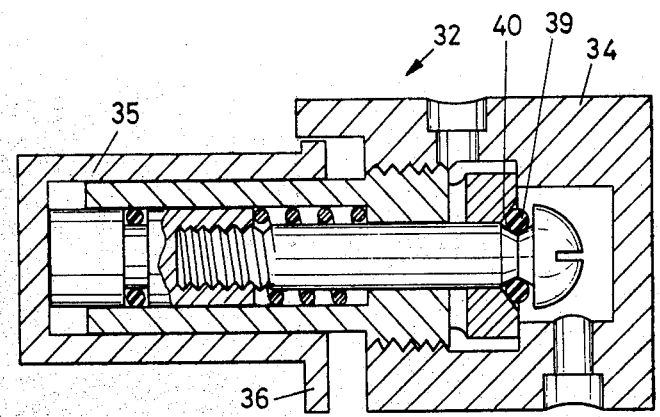
Figure 5:
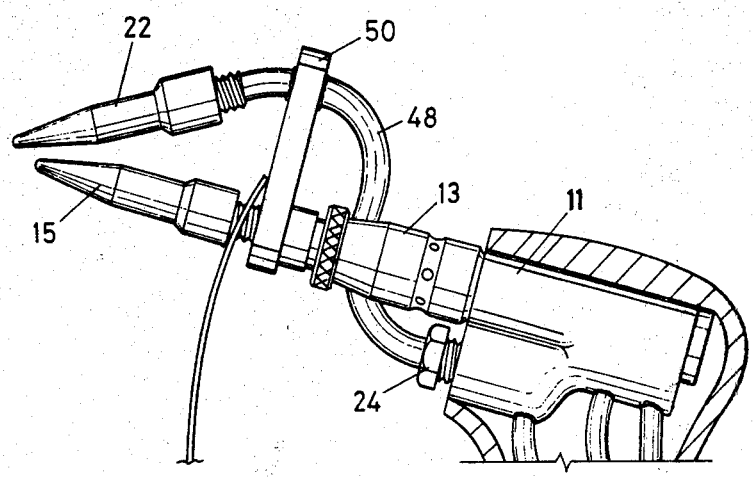

An embodiment of the invention is described hereunder in some detail with reference to and as illustrated in the accompanying drawings in which:

FIG. 1 is a perspective view of a welding cutting handpiece showing both nozzles and the guard in position, FIG. 2 is a side elevation of the same, but with the handpiece cover removed, FIG. 3 is an enlarged section through a shut-off valve, FIG. 4 is an enlarged section through an oxygen valve, and FIG. 5 is a view corresponding to FIG. 2 but showing the cutting nozzle located above the flame nozzle.

Referring first to FIG. 1, a welding and cutting handpiece 10 comprises a body 11 to which a body handle 12 is secured, the body 11 having a threaded and apertured ferrule 13 projecting therefrom into which is secured an adaptor 14, the adaptor itself containing a screw threaded recess at its outer end in which is secured the flame nozzle 15. The body, ferrule, adaptor and nozzle are constructed substantially as shown in said patent application Ser. No. 859,589 and result in a gas issuing from the flame nozzle 15 which is substantially non-turbulent, and which has other characteristics not yet completely understood but which result in a very high temperature very small area flame which is useful for highly efficient welding without oxidation of a workpiece.

A hand guard 18 clips over a valve body 19 with a pair of spring wire clips 20 at one end, and the other end contains an aperture which passes over portion of the threaded adaptor 14, and the guard is retained in place by the flame nozzle 15. Removal of the guard is simply effected by removal of the nozzle.

A cutting nozzle 22 is positioned forwardly of the flame nozzle 15 and inclined with respect to the flame nozzle 15 and is on the end of a hollow stem 23 which is retained in a threaded recess (not shown) in the body 11 by means of a nut 24, which said nut can readily be released and replaced by a plug (also not shown).

The valve body 19 contains two valves each of which is as shown in FIG. 3, the valve 25 being the oxygen valve and the valve 26 being the valve utilized for the combustible gas. Each valve is a screw threaded valve, constructed substantially as shown in FIG. 3, and having a steel ball 27 carried in a screw threaded member, the ball 27 being effective to seal the conduit through the valve.

An oxygen tube 29 conducts oxygen from valve 25 to body 11, while a combustible gas tube 30 conducts the combustible gas (the acetylene or propane) to the body 11. A second oxygen tube 31 conducts oxygen to a push button valve 32 which is shown in detail in FIG. 4, and from the valve 32, an extension of the oxygen tube 31 conducts oxygen to the tubular stem 23 of the cutting nozzle 22.

As can be seen in FIGS. 2 and 3, the push button valve 32 has a valve body 34 and a push button 35 which is both slidable and rotatable with respect to the valve body 34. An outstanding flange 36 limits outward movement, and the arrangement is such that when the projection 37 on the flange 36 is rotated 90° from the position shown in FIG. 2, it is not possible to depress the push button 35 since the projection 37 will abut the body 34. However, when the push button is depressed, as can be seen best from FIG. 4, a valve 39 is lifted away from a seat 40.

FIG. 1 also shows a simple light-weight guide assembly designated 42 which has a pair of spaced wheels 43 carried on legs 44 which are adjustable for position by means of wing nuts 45. This assembly also is readily removable from the adaptor 14 by simply removing the flame nozzle 15.

As described, the flame nozzle overlies the cutting nozzle, but for some jobs it is desirable that the cutting nozzle should overlie the flame nozzle, and as shown in FIG. 5, the cutting nozzle 22 comprises a curved extension tube 48, by which it overlies the flame nozzle 15. In both cases a spacer 50 supports the cutting nozzle 22.

It has been found, contrary to expectation, that a welding and cutting handpiece in accordance with this invention not only greatly improves the welding features of a welding torch, as described in my application Ser. No. 859,589 but also greatly improves the cutting. The surface of a cut effected by the handpiece will be found to be smoother and less oxidised than the surface of a cut which has been made with a handpiece according to prior art. The width of the cut is much less and it is possible to restart the cut without necessarily increasing width. Cutting can take place in any direction without danger of burning the skin of the operator's hand. Since there is less heat imparted to the workpiece, there is reduced distortion. Whereas prior art adds additional oxygen to the oxy-acetylene flame which surrounds the cutting jet on a cutting torch, in this invention the flame issuing from the flame nozzle 15 is adjusted to have a very slight excess of oxygen, and this oxygen content of the flame is slightly reduced when the push button 35 is depressed to allow flow of oxygen from the cutting nozzle.

As described in said patent application Ser. No. 859,589 the ferrule 13 is provided with a plurality of apertures which will admit the passage of air when the adaptor 14 is screwed outwardly by a distance readily ascertained by an operator, and when air is so used, the consumption of oxygen can be reduced or eliminated and the torch may be used for pre-heating.

So effective is the torch for welding purposes that welding can sometimes be effected with propane instead of acetylene as the combustible gas, although the time taken to effect a weld may be greater than with acetylene.

I claim:

1. A welding and cutting handpiece which is useful as an oxy-acetylene torch, having a flame nozzle which is in gas flow communication with a gas mixing chamber, a cutting nozzle having an oxygen directing aperture extending therethrough and being in gas flow communication with an oxygen conduit in the handpiece, and means securing the cutting nozzle to be so inclined to the flame nozzle as to direct an oxygen stream from one side of a flame into the flame of combustible gas when a flame issues from the flame nozzle.

2. A welding and cutting handpiece which is useful as an oxy-acetylene torch according to claim 1 wherein said gas mixing chamber comprises a gas mixture directing aperture having a length exceeding its diameter, and walls defining a secondary mixing chamber of greater volume than the primary mixing chamber and also has its length exceeding its diameter which in turn exceeds the diameter of the gas mixture directing aperture.

3. A welding and cutting handpiece which is useful as an oxy-acetylene torch according to either claim 1 or claim 2 wherein said oxygen stream is directed into said flame to intercept said flame near but not in the inner cone thereof.

4. A welding and cutting handpiece which is useful as an oxy-acetylene torch according to claim 1 wherein said handpiece has walls defining a threaded aperture, there also being provided a threaded closure plug, said plug and said cutting nozzle alternatively threadably and sealably engaging said threaded aperture.

5. A welding and cutting handpiece which is useful as an oxy-acetylene torch according to claim 4 wherein said cutting nozzle underlies said flame nozzle.

6. A welding and cutting handpiece which is useful as an oxy-acetylene torch according to claim 4 wherein said cutting nozzle comprises a curved extension tube and overlies said flame nozzle.

7. A welding and cutting handpiece which is useful as an oxy-acetylene torch according to claim 1 or claim 2 further comprising a hand guard, and means releasably securing said hand guard to said nozzle.

8. A welding and cutting handpiece which is useful as an oxy-acetylene torch according to claim 1 further comprising a push button type valve carried by said handpiece and being in said oxygen conduit and operable to allow or prevent oxygen flow to said cutting nozzle.

9. A welding and cutting handpiece which is useful as an oxy-acetylene torch according to claim 8 wherein said push button valve has an operating push button slidably movable in a valve body between an open and closed position, and also being rotatable in said body between a first position wherein it is so slidably movable and a second position wherein co-operating surfaces on the push button and valve body inhibit said slidable movement.

* * * * *